No. 719,204. PATENTED JAN. 27, 1903.
C. E. ELLICOTT & J. B. NORRIS.
FRICTION CLUTCH.
APPLICATION FILED JUNE 19, 1902.

NO MODEL.

Witnesses
Herman Newman
Charles L Durborow

Inventors.
Charles E. Ellicott
per John B. Norris
Chafin A. Ferguson
Attorney.

THE NORRIS PETERS CO., PHOTO-LITHO., WASHINGTON, D. C.

UNITED STATES PATENT OFFICE.

CHARLES E. ELLICOTT AND JOHN B. NORRIS, OF BALTIMORE, MARYLAND.

FRICTION-CLUTCH.

SPECIFICATION forming part of Letters Patent No. 719,204, dated January 27, 1903.

Application filed June 19, 1902. Serial No. 112,272. (No model.)

*To all whom it may concern:*

Be it known that we, CHARLES E. ELLICOTT and JOHN B. NORRIS, citizens of the United States, residing at Baltimore, in the State of Maryland, have invented certain new and useful Improvements in Friction-Clutches, of which the following is a specification.

This invention relates to improvements in friction-clutches.

The object of the invention is to provide a device that can be readily changed from hand to electric, steam, or other suitable power other than hand, or vice versa, for driving a shaft from which power can be transmitted to any desirable point.

Other features of the invention will be fully set forth in the description of the accompanying drawings, in which—

Figure 1:
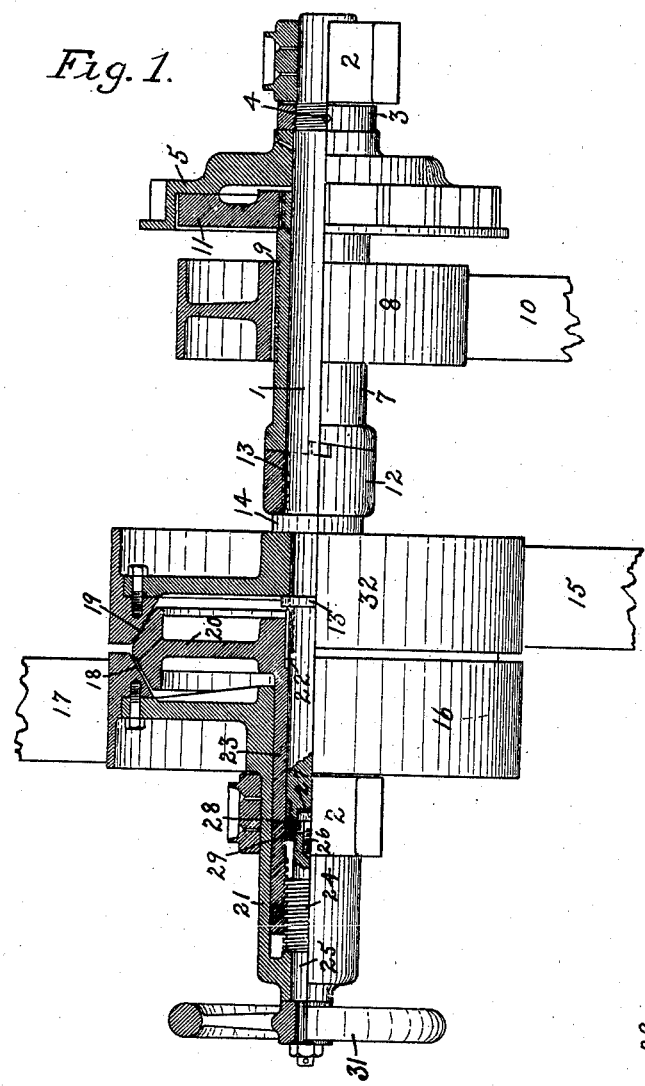
Figure 4:
Figure 3:
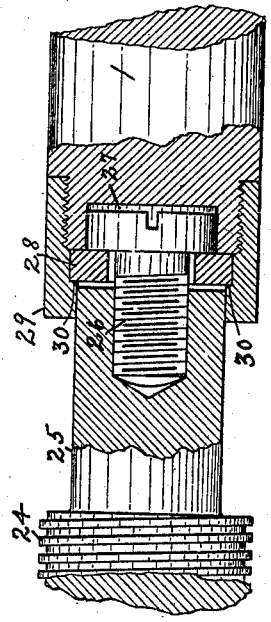
Figure 2:
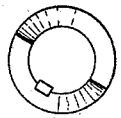

Figure 1 is a front elevation, partly in section, of a shaft and the operative parts mounted thereon. Fig. 2 is an end view of the inclined faced collar to be keyed to the shaft. Fig. 3 is an enlarged detailed view of the short secondary shaft, showing the means of connecting the same to the main shaft. Fig. 4 is a detailed view of the pawl and ratchet.

Similar numerals designate like parts throughout the several views.

In the accompanying drawings, forming part of this specification, 1 designates the main shaft mounted in the bearings 2. Near one end of the shaft 1 is a collar 3, screw-threaded upon said shaft and held securely in position by means of a pin 4, which extends through the said collar and into the shaft 1. Loosely mounted upon the shaft 1 is a ratchet-wheel 5, having a pawl 6 to prevent the backward rotation thereof. The sleeve 7 is also loosely mounted upon the shaft 1 and is provided with a pulley 8, keyed thereto at 9. Motion is transmitted from the pulley 8 by means of the belt 10 to any desired point. To one end of the sleeve 7 is keyed a friction-disk 11, which contacts with the ratchet-wheel 5 and causes the latter to revolve when the sleeve 7 is forced to the right by the collar 12. The collar 12 is keyed to the shaft 1 at 13 and impinges against the collar 14, by means of which latter the said collar 12 is prevented from moving to the left on the said shaft 1. The facing-surfaces of the sleeve 7 and collar 12 are provided with a double incline, so that when the shaft 1 is revolved in one direction the sleeve 7 will be moved to the right along the said shaft, carrying with it the friction-disk 11 and forcing the latter against the ratchet-wheel 5, which in turn is forced against the collar 3, which causes the friction between the collar 12 and sleeve 7 and between the ratchet-wheel 5 and friction-disk 11 to increase to such a degree that all the said parts will revolve with the shaft 1. When the shaft 1 is held stationary, the pulley 8, and consequently the sleeve 7, will be prevented from revolving backward or in the direction opposite to that above described, as the slightest backward movement of the said pulley would cause the sleeve 7 to move to the right, owing to the inclined facing-surfaces of the said sleeve and collar 12, and force the friction-disk 11 against the ratchet-wheel 5, which latter is held by the pawl 6.

A pulley 32 is loosely mounted upon the shaft 1 and is prevented from moving longitudinally on the said shaft by means of the collars 13 and 14. This pulley 32 is driven by hand-power from any suitable point through the medium of the belt 15. The pulley 16 is also loosely mounted on the shaft 1 and is driven from any desired point by electricity, steam, or other suitable power other than hand through the medium of the belt 17. The pulley 16 is formed with a hollow hub 21, which extends through the bearing 2. The pulleys 16 and 32 are each provided with inclined faces 18 and 19, against which the friction-clutch 20 is forced when it is desired to drive either one or the other of said pulleys. The friction-clutch 20 is keyed to the shaft 1 at 22, but is free to move a limited distance longitudinally on the said shaft. The outer surface of the said clutch 20 is inclined to correspond to the inclined faces 18 and 19 of the pulleys 32 and 16. This clutch 20 is provided with a sleeve 23, integral therewith, which extends into the hollow hub 21 of the pulley 16 and is screw-threaded on the inside to mesh with the screw-threads 24 on the secondary shaft 25. A secondary shaft 25 projects through the end of the hollow hub 21 and extends into the sleeve 23 and has its inner end revolubly secured to the shaft 1. This shaft 25 is held to the shaft 1 by means of a bolt 26, having its head embedded in a recess 27 in the end of the said shaft 1 and the opposite end screwed into the end of the shaft 25. Between the head of the bolt 26 and the end of the shaft 25 is a collar 28. A nut 29 is screwed over the end of the shaft 1 and is provided with a shoulder 30, which impinges against the collar 28 and holds the latter tightly against the end of the shaft 1 and prevents the head of the bolt 26 from pulling out of the recess 27. The recess 27 in the end of the shaft 1 is sufficiently deep to allow the head of the bolt 26 to revolve freely therein. On the outer end of the shaft 25 is rigidly secured a hand-wheel 31, by means of which the shaft 25 is turned for the purpose of moving the friction-clutch longitudinally on the shaft 1 and changing the contact of the said clutch from the pulley 32 to the pulley 16, or vice versa, thereby changing the mode of operation of the shaft 1.

When it is desired to work the device as a hand-power machine, the wheel 31 is turned until the friction-clutch 20 is forced against the pulley 32, to which motion is transmitted from any suitable hand-driven device through the medium of the belt 15. As the pulley 32 revolves, being in contact with the clutch 20, it will carry the said clutch with it, which latter being keyed to the shaft 1 causes the latter to revolve. As the shaft 1 revolves, the collar 12, being keyed to the shaft 1, forces the sleeve 7 to the right on the shaft 1 and causes the friction-disk 11 to contact with the ratchet-wheel 5, which latter is forced against the collar 3. At this point the friction of the parts is so great that the sleeve 7 and consequently the pulley 8 are caused to revolve with the shaft 1. The pulley 8, being keyed to the sleeve 7, will revolve with the latter and transmit motion to any desired point through the medium of the belt 10. When it is desired to work the device by steam, electricity, or other power, except by hand, the wheel 31 is turned in the opposite direction until the friction-clutch 20 contacts with the pulley 16, to which motion is transmitted from any suitable power, except hand, through the medium of the belt 17. The result of driving this pulley 16 will be identical with that described for the pulley 32.

When it is desired to reverse the pulley 8—say for the purpose of lowering a load which has been raised—the shaft 1 is reversed, and as the collar 12 revolves the action of the inclined facing-surfaces of the said collar 12 and sleeve 7 will allow the latter to move along the shaft 1 to the left sufficiently to release the friction-disk 11 from contact with the ratchet-wheel 5 and permit the sleeve 7, and consequently the pulley 8, to revolve with the shaft 1. Should the said pulley 8 and sleeve 7 attempt to revolve faster than the shaft 1, this will be prevented by the action of the inclined faces of the said sleeve 7 and collar 12. The backward motion of the sleeve, if traveling faster than the shaft 1, would cause the inclined face of the sleeve to ride up on the highest part of the inclined face of the collar 12 and force the sleeve to the right and cause the friction-disk 11 to contact with the ratchet-wheel 5, and as the latter is held by the pawl 6 the said sleeve and pulley would be held and prevented from traveling faster than the shaft 1.

It is obvious that gear-wheels may be substituted for the pulleys herein shown and described.

Having thus described our invention, what we claim as new, and desire to secure by Letters Patent, is—

1. The combination of the main shaft having two pulleys loosely mounted thereon, one of said pulleys having an integral hollow hub; a friction-clutch keyed to said shaft and having an integral sleeve projecting into the said hollow hub and screw-threaded on the inner surface; a secondary shaft secured to, and revoluble independent of, the main shaft and being screw-threaded to mesh with the threads on the integral sleeve; and a wheel keyed to the secondary shaft for revolving the latter, whereby the said clutch is thrown in or out of engagement with either of the said pulleys.

2. The combination with the main shaft having two pulleys loosely mounted thereon, one of said pulleys having an integral hollow hub; a friction-clutch keyed to said shaft and having an integral sleeve projecting into the said hollow hub; a secondary shaft secured to, and revoluble independent of, the main shaft and being screw-threaded to mesh with the threads on the integral sleeve; a bolt screwed into the end of the secondary shaft and having its head embedded in the end of the main shaft; a collar fitted on said bolt between the end of the secondary shaft and the head of the bolt; a nut screw-threaded upon the end of the main shaft and having a shoulder impinging against the said collar; and a wheel on the outer end of the secondary shaft to turn the latter for the purpose of throwing the friction-clutch in or out of engagement with the pulleys on the main shaft.

3. The combination of the main shaft having two pulleys loosely mounted thereon, one of said pulleys having an integral hollow hub; a friction-clutch keyed to said shaft and having an integral sleeve projecting into the said hollow hub and screw-threaded on the inner surface; a secondary shaft secured to, and revoluble independent of, the main shaft and being screw-threaded to mesh with the threads on the integral sleeve; a wheel keyed to the secondary shaft for revolving the latter, whereby the said clutch is thrown in or out of engagement with either of the said pulleys; a ratchet-wheel loosely mounted on the main shaft; means on said shaft to limit the movement of the said ratchet-wheel in one direction; a sleeve loosely mounted on said main shaft and having a friction-disk at one end and the opposite end having an inclined face; a pulley keyed to said sleeve; a collar keyed to said main shaft and having an inclined facing-surface, whereby when the said shaft is revolved the inclined facing-surfaces of the said collar and sleeve will cause the latter to move to the right causing the friction-disk to contact with the ratchet-wheel until the friction of the parts increases to such a degree as to cause the sleeve, and consequently the pulley keyed thereto, to revolve with the main shaft.

In testimony whereof we affix our signatures in the presence of two witnesses.

CHARLES E. ELLICOTT.
    JOHN B. NORRIS.

Witnesses:
    CHAPIN A. FERGUSON,
    HERMAN NEWNAN.